United States Patent
Noda et al.

(10) Patent No.: US 10,493,984 B2
(45) Date of Patent: Dec. 3, 2019

(54) VEHICLE CONTROL METHOD AND VEHICLE CONTROL DEVICE

(71) Applicant: Nissan Motor Co., Ltd., Yokohama-shi, Kanagawa (JP)

(72) Inventors: Kuniaki Noda, Kanagawa (JP); Fang Fang, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/311,883

(22) PCT Filed: Jun. 27, 2016

(86) PCT No.: PCT/JP2016/068972
§ 371 (c)(1),
(2) Date: Dec. 20, 2018

(87) PCT Pub. No.: WO2018/002984
PCT Pub. Date: Jan. 4, 2018

(65) Prior Publication Data
US 2019/0193727 A1 Jun. 27, 2019

(51) Int. Cl.
| | |
|---|---|
| B60W 30/09 | (2012.01) |
| B60T 7/22 | (2006.01) |
| B60W 10/04 | (2006.01) |
| B60W 40/04 | (2006.01) |
| G08G 1/16 | (2006.01) |
| B60W 10/184 | (2012.01) |

(52) U.S. Cl.
CPC ............. *B60W 30/09* (2013.01); *B60T 7/22* (2013.01); *B60W 10/04* (2013.01); *B60W 10/184* (2013.01); *B60W 40/04* (2013.01); *G08G 1/166* (2013.01); *G08G 1/167* (2013.01); *B60T 2201/022* (2013.01); *B60W 2420/52* (2013.01); *B60W 2550/10* (2013.01)

(58) Field of Classification Search
CPC .... B60W 30/09; B60W 10/04; B60W 10/184; B60W 40/04; B60T 7/22; G08G 1/166; G08G 1/167
USPC .......................................................... 701/70
See application file for complete search history.

(56) References Cited

U.S. PATENT DOCUMENTS

| | | | |
|---|---|---|---|
| 9,139,174 B2 | 9/2015 | Akiyama | |
| 2005/0125125 A1* | 6/2005 | Matsumoto | ............ G08G 1/167 701/41 |
| 2006/0284760 A1 | 12/2006 | Natsume | |

(Continued)

FOREIGN PATENT DOCUMENTS

| | | |
|---|---|---|
| JP | 2006349456 A | 12/2006 |
| JP | 2008250503 A | 10/2008 |

(Continued)

*Primary Examiner* — Yazan A Soofi
(74) *Attorney, Agent, or Firm* — Young Basile Hanlon & MacFarlane, P.C.

(57) ABSTRACT

A vehicle control method includes: detecting a blocking object that is at a position at which the blocking object obstructs travel of the tracked vehicle in a traffic lane in which the tracked vehicle is traveling and that hides at least part of the traffic lane from the sensor, and an oncoming vehicle traveling in a direction toward the tracked vehicle in an oncoming lane opposite from the traffic lane; and slowing down the vehicle when the oncoming vehicle slows down.

7 Claims, 8 Drawing Sheets

(56) References Cited

U.S. PATENT DOCUMENTS

| | | | |
|---|---|---|---|
| 2008/0119993 A1* | 5/2008 | Breed | B60R 19/205 |
| | | | 701/46 |
| 2014/0316668 A1 | 10/2014 | Akiyama | |
| 2015/0166062 A1* | 6/2015 | Johnson | B60W 30/12 |
| | | | 701/41 |
| 2015/0224988 A1 | 8/2015 | Buerkle et al. | |
| 2018/0093676 A1* | 4/2018 | Emura | G06K 9/00288 |
| 2018/0118223 A1* | 5/2018 | Mori | B60W 40/09 |
| 2018/0215380 A1* | 8/2018 | Devi | B60W 30/143 |
| 2019/0213886 A1* | 7/2019 | Noda | G08G 1/166 |

FOREIGN PATENT DOCUMENTS

| | | |
|---|---|---|
| JP | 2009116790 A | 5/2009 |
| JP | 2012080221 A | 4/2012 |
| JP | 2016030512 A | 3/2016 |
| RU | 2570982 C2 | 12/2015 |

* cited by examiner

VEHICLE CONTROL METHOD AND VEHICLE CONTROL DEVICE

TECHNICAL FIELD

The present invention relates to vehicle control methods and vehicle control devices for estimating distances between vehicles.

BACKGROUND

Japanese Patent Application Publication No. 2012-80221 discloses a target tracking device that, when a tracked target is hidden by multiple blocking object, calculates an estimated hiding time based on the difference between the movement vectors of each of the blocking objects and the tracked target.

Unfortunately, since a technique described in Japanese Patent Application Publication No. 2012-80221 calculates the estimated hiding time using the speed at the time when the tracked target is hidden, the timing at which the tracked target will come close may not be estimated accurately when the speed of the tracked target may change in the hidden area. For this reason, in the case where the technique described in Japanese Patent Application Publication No. 2012-80221 is used for vehicle control, there is a possibility that the vehicle control according to speed change of the tracked target may not be achieved.

SUMMARY

In light of the above problem, an object of the present invention is to provide a vehicle control method and a vehicle control device capable of vehicle control according to speed change of a tracked target.

A vehicle control method according to an aspect of the present invention includes: detecting a blocking object that is at a position at which the blocking object obstructs travel of the tracked vehicle in a traffic lane in which the tracked vehicle is traveling and that hides at least part of the traffic lane from the sensor, and an oncoming vehicle traveling in a direction toward the tracked vehicle in an oncoming lane opposite from the traffic lane; and slowing down the vehicle when the oncoming vehicle slows down.

The aspect of the present invention provides a vehicle control method and a vehicle control device capable of vehicle control according to speed change of the tracked target.

DETAILED DESCRIPTION

With reference to the drawings, an embodiment of the present invention will be described. In the illustration of the drawings, the same or similar parts are denoted by the same or similar reference signs, and description of those parts will be omitted.

[Vehicle Control Device]

Figure 1:
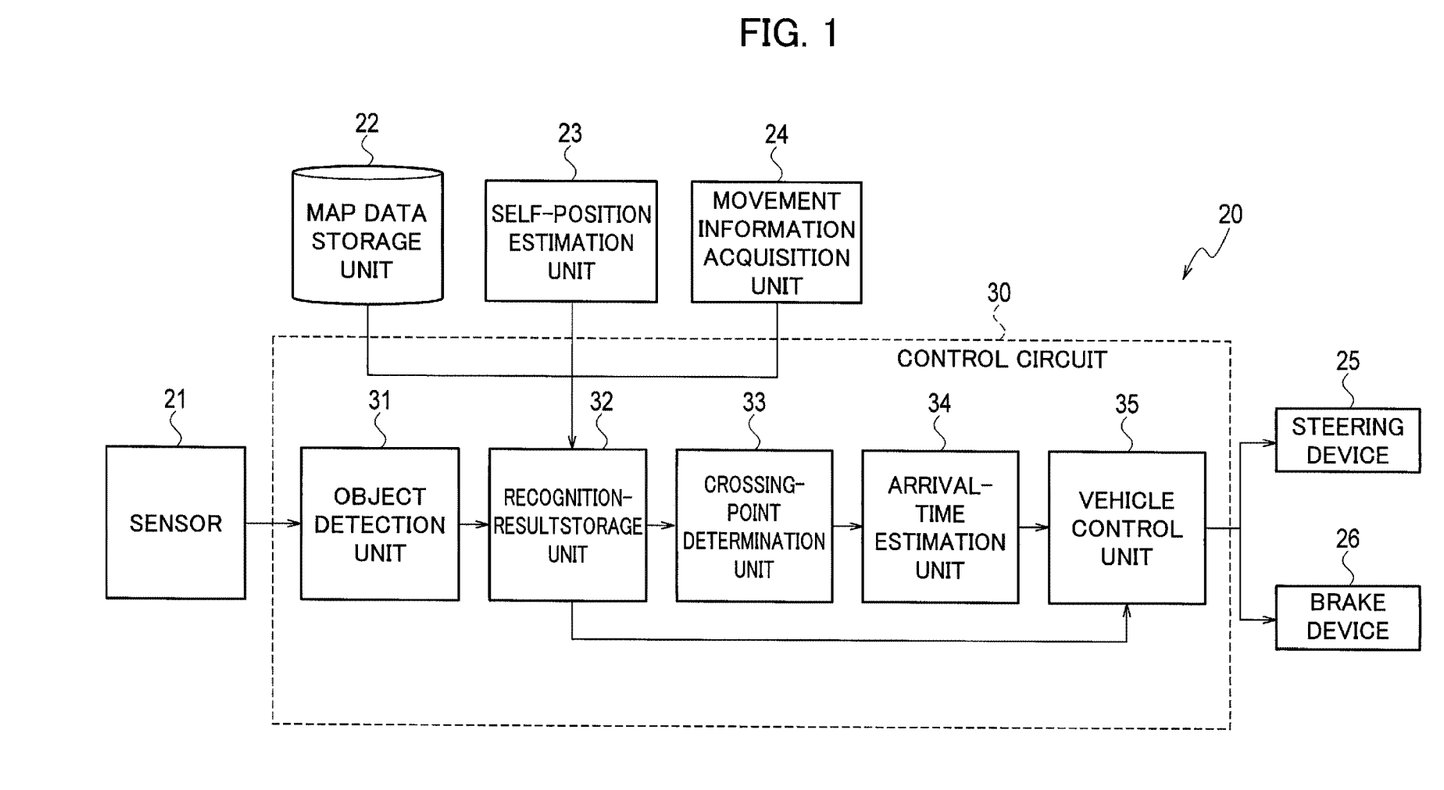
FIG. 1 is a schematic block diagram for explaining a basic structure of a vehicle control device according to an embodiment of the present invention.
Figure 2:
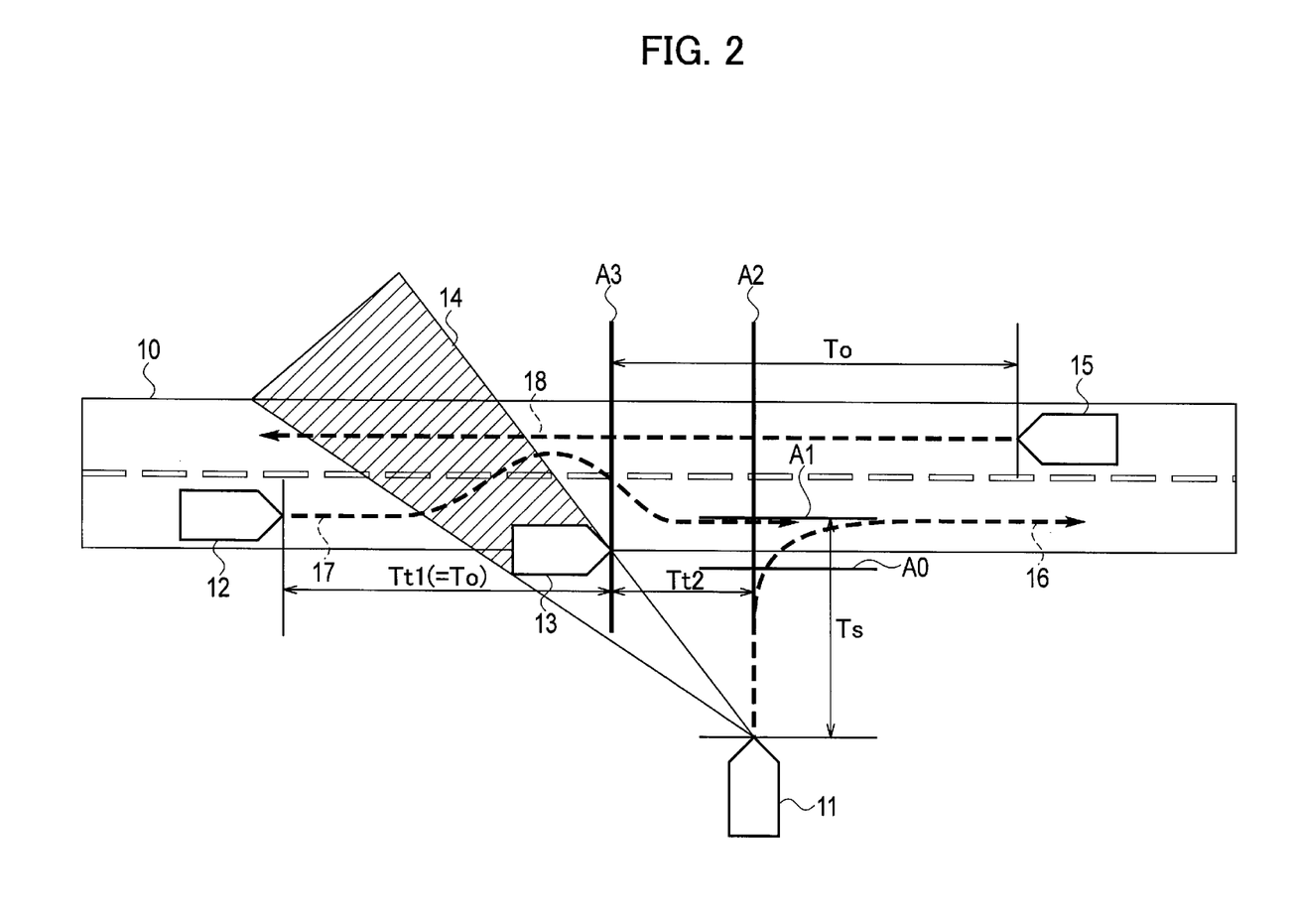
FIG. 2 is a diagram for explaining a scene in which a vehicle having the vehicle control device according to the embodiment of the present invention is merging into a nearest traffic lane.

FIG. 1 is a block diagram illustrating the configuration of a vehicle control device 20 according to this embodiment. The vehicle control device 20 includes a sensor 21, map data storage unit 22, self-position estimation unit 23, movement information acquisition unit 24, steering device 25, brake device 26, and control circuit 30. The vehicle control device 20, for example, is mounted on a vehicle 11 (an own vehicle) and controls the vehicle 11 according to estimated behavior of a tracked vehicle 12, as illustrated in FIG. 2.

The sensor 21, mounted on the vehicle 11, detects position information on objects around the vehicle 11 and outputs the position information to the control circuit 30. For the sensor 21, for example, a distance measuring sensor or image sensor, such as a laser range finder (LRF), millimeter wave radar, ultrasonic sensor, and stereo camera, can be employed. The sensor 21 may include multiple kinds of sensors, and the sensor 21 may detect speeds, accelerations, shapes, colors, and the like of surrounding objects. The sensor 21 acquires 3-dimensional distance data of the surrounding environment, for example, by scanning a specified range around the vehicle 11. The 3-dimensional distance data is point group data indicating relative 3-dimensional positions from the sensor 21.

The map data storage unit 22 is a storage device for storing high definition map data. The map data storage unit 22 may be mounted on the vehicle 11 or may be provided on a server or the like via a communication line. The map data can include not only general map information, such as roads, intersections, bridges, tunnels, and the like but also information on road structures, such as positions and traffic zone classifications of traffic lanes and information on positions, shapes, and the like of planimetric features around roads.

The self-position estimation unit 23 estimates the self-position of the vehicle 11 on the map data stored in the map data storage unit 22. The self-position includes the orientation of the vehicle 11. The self-position estimation unit 23 estimates the self-position based on information acquired from a positioning device, such as a global positioning system (GPS) receiver, and an acceleration sensor, angular speed sensor, steering angle sensor, and speed sensor mounted on the vehicle 11. The self-position estimation unit 23 may estimate a more precise self-position on the map data by calculating the relative position of the vehicle 11 with respect to planimetric features stored in the map data from information acquired from the sensor 21.

The movement information acquisition unit 24 acquires movement information indicating the movement state of the vehicle 11, such as the speed, acceleration, angular speed, and steering angle. The movement information is acquired from the speed sensor, acceleration sensor, angular speed sensor, steering angle sensor, and the like mounted on the vehicle 11.

The steering device 25 includes an actuator that steers the vehicle 11 under the control of the control circuit 30. The brake device 26 includes an actuator that performs braking operation of the vehicle 11 under the control of the control circuit 30.

The control circuit 30 includes an object detection unit 31, recognition-result storage unit 32, crossing-point determination unit 33, arrival-time estimation unit 34, and vehicle control unit 35. The control circuit 30 includes a programmed processing device, such as a processing device including electrical circuitry. In addition, the processing circuit can include devices such as an application specific integrated circuit (ASIC), adapted to perform specified functions, and circuit parts. The control circuit 30 can include one or more processing circuits. The control circuit 30 may also serve as an electronic control unit (ECU) used for other control related to the vehicle 11.

The object detection unit 31 detects observable objects around the vehicle 11 based on information acquired by the sensor 21. The observable objects are objects that are not hidden from the sensor 21 by obstacles and can be observed by the sensor 21. The object detection unit 31 acquires attribute information on the observable objects, based on the information acquired by the sensor 21, the map data stored in the map data storage unit 22, the self-position estimated by the self-position estimation unit 23, and the movement information acquired by the movement information acquisition unit 24. The attribute information can include the positions, speeds, accelerations, angular speeds, orientations, shapes, colors, and kinds of the observable objects. The object detection unit 31 sets identifiers (IDs) for the detected observable objects and determines attribute information and IDs on the observable objects as object information on the observable objects. In other words, the object information includes movement information such as speed, acceleration, and angular speed.

Based on the self-position estimated by the self-position estimation unit 23 and the movement information acquired by the movement information acquisition unit 24, the recognition-result storage unit 32 associates the object information acquired from the object detection unit 31 with the map data stored in the map data storage unit 22 and store it as the recognition result. The recognition-result storage unit 32 maps the object information determined by the object detection unit 31 on the map data. The recognition-result storage unit 32 keeps the IDs for the stored object information and thus can track the observable objects.

In an example illustrated in FIG. 2, the recognition-result storage unit 32 stores the object information on each of the tracked vehicle 12, a blocking object 13, and an oncoming vehicle 15 which are the observable objects. The tracked vehicle 12 is travelling in a nearest traffic lane on a road 10 orthogonal to the vehicle 11. The blocking object 13 is located at a position at which the blocking object 13 obstructs the travel of the tracked vehicle 12 in the traffic lane where the tracked vehicle 12 is travelling and hides the traffic lane from the sensor 21. The blocking object 13 is, for example, a parked vehicle. The oncoming vehicle 15 is travelling in an oncoming lane opposite from the traffic lane where the tracked vehicle 12 is travelling, in the direction toward the tracked vehicle 12. The recognition-result storage unit 32 stores information on a hidden area 14 hidden from the sensor 21 by the blocking object 13 detected by the object detection unit 31.

The crossing-point determination unit 33 determines crossing point A1 of the vehicle 11, crossing point A2 of the tracked vehicle 12, and crossing point A3 of the oncoming vehicle 15, based on the object information stored in the recognition-result storage unit 32. Crossing point A1 of the vehicle 11 and crossing point A2 of the tracked vehicle 12 are defined by the crossing point of the travelling route 16 of the vehicle 11 and the travelling route 17 of the tracked vehicle 12. Crossing point A3 of the oncoming vehicle 15 is defined by a position on the travelling route 18 of the oncoming vehicle 15 at which the oncoming vehicle 15 gets close to the blocking object 13.

The arrival-time estimation unit 34 estimates times T to be taken for the vehicle 11, tracked vehicle 12, and oncoming vehicle 15 to reach crossing points A1, A2, and A3, respectively, based on the object information stored in the recognition-result storage unit 32 and crossing points A determined by the crossing-point determination unit 33. The arrival-time estimation unit 34 calculates time Ts to be taken for the vehicle 11 to reach crossing point A1, from the speed of the vehicle 11 and the distance from the vehicle 11 to crossing point A1. The arrival-time estimation unit 34 calculates time Tt to be taken for the tracked vehicle 12 to reach crossing point A2, from the speed of the tracked vehicle 12 and the distance from the tracked vehicle 12 to crossing point A2. The arrival-time estimation unit 34 calculates time To to be taken for the oncoming vehicle 15 to reach crossing point A3, from the speed of the oncoming vehicle 15 and the distance from the oncoming vehicle 15 to crossing point A3.

The vehicle control unit 35 controls driving of the vehicle 11 by controlling drive mechanisms of the vehicle 11, such as the steering device 25 and the brake device 26. The vehicle control unit 35 controls the vehicle 11 such that the vehicle 11 travels on the travelling route 16 set in advance.

[Vehicle Control Method]

With reference to flowcharts of FIGS. 3 and 4, an example of a vehicle control method using the vehicle control device 20 will be described. As illustrated in FIG. 2, description will be provided for an example of a scene in which the vehicle 11 having the vehicle control device 20 is merging into the nearest traffic lane on the road 10 ahead.

The road 10 extends in the direction orthogonal to a traveling direction of the vehicle 11. On the left front side of the vehicle 11 is located the blocking object 13, which is a parked vehicle, at a position at which the blocking object 13 obstructs the travel of the tracked vehicle 12 in the traffic lane where the tracked vehicle 12 is traveling. The blocking object 13 is located at the opposite side from the oncoming lane in the traffic lane where the tracked vehicle 12 is travelling. The blocking object 13 makes the hidden area 14 hidden from the sensor 21 in the traffic lane where the tracked vehicle 12 is travelling. In the oncoming lane which is a traffic lane on the far side of the road 10 is the oncoming vehicle 15 travelling in the direction toward the tracked vehicle 12. The vehicle 11 is going to merge into the traffic lane where the tracked vehicle 12 is traveling.

First, at step S10 the sensor 21 acquires information on the surrounding environment including a tracked object (the tracked vehicle 12). In the example illustrated in FIG. 2, the sensor 21 acquires the position information, at least, on multiple objects ahead of the vehicle 11.

At step S11, the object detection unit 31 detects multiple observable objects and object information on each object, based on the information acquired at step S10. The multiple observable objects include the tracked vehicle 12 travelling outside the hidden area 14, the blocking object 13 making the hidden area 14, and the oncoming vehicle 15 traveling in the traffic lane opposite to the tracked vehicle 12.

At step S12, the recognition-result storage unit 32 maps the object information on the observable objects detected at step S11 and the object information on the vehicle 11 on the map data, based on the map data, self-position, and movement information.

At step S13, the crossing-point determination unit 33 determines crossing points A1, A2, and A3 of the vehicle 11, tracked vehicle 12, and oncoming vehicle 15, based on the object information mapped at step S12. Crossing points A1 and A2 are generally positioned in the traffic lane of the road 10 ahead of the vehicle 11. Crossing point A3 of the oncoming vehicle 15 indicates a position where the oncoming vehicle 15 may cross the tracked vehicle 12 when the tracked vehicle 12 travels getting into the oncoming lane to avoid the blocking object 13.

At step S14, the arrival-time estimation unit 34 calculates time To to be taken for the oncoming vehicle 15 to reach crossing point A3, based on the movement information on the oncoming vehicle 15 mapped at step S12 and crossing point A3 determined at step S13.

At step S15, the arrival-time estimation unit 34 calculates time Ts to be taken for the vehicle 11 to reach crossing point A1, based on the movement information on the vehicle 11 mapped at step S12 and crossing point A1 determined at step S13. The arrival-time estimation unit 34 may calculate time Ts, based on the movement information acquired by the movement information acquisition unit 24.

At step S16, the arrival-time estimation unit 34 calculates time Tt to be taken for the tracked vehicle 12 to reach crossing point A2, based on the movement information on the tracked vehicle 12 mapped at step S12 and crossing point A2 determined at step S13. Time Tt is the sum of time Tt1 to be to be taken for the tracked vehicle 12 to reach crossing point A3 and time Tt2 to be taken for the tracked vehicle 12 to reach crossing point A2 from the time when the tracked vehicle 12 passes through crossing point A3.

It is assumed in this embodiment that which of the tracked vehicle 12 and the oncoming vehicle 15 passes by the blocking object 13 first cannot be predicted easily. Accordingly, time Tt1 can be regarded as a time until the tracked vehicle 12 meets the oncoming vehicle 15 at crossing point A3. In other words, time Tt1 is time To calculated at step S14. In addition, time Tt1 is approximately a passing time until the tracked vehicle 12 passes by the blocking object 13.

When the tracked vehicle 12 is travelling outside the hidden area 14, time Tt2 is calculated from the movement information on the tracked vehicle 12 mapped at step S12 and the distance from crossing point A3 to crossing point A2.

While the tracked vehicle 12 is travelling inside the hidden area 14, the movement information on the tracked vehicle 12 cannot be obtained. Hence, based on the assumption that the tracked vehicle 12 traveling inside the hidden area 14 is travelling toward crossing point A3 approximately at the same speed as the oncoming vehicle 15, time Tt2 is estimated from the speed of the oncoming vehicle 15 mapped at step S12 and the distance from crossing point A3 to crossing point A2. Thus, time Tt2 is approximately the arrival time to be taken for the tracked vehicle 12 to reach the front of the vehicle 11. It is noted that assuming that the tracked vehicle 12 travels in the hidden area 14 at the same speed as before entering the hidden area 14, time Tt2 may be estimated from the speed of the tracked vehicle 15 before entering the hidden area 14 and the distance from crossing point A3 to crossing point A2.

After step S17, the vehicle control unit 35 determines speed control for the vehicle 11 used until the vehicle 11 reaches crossing point A1 and judges whether or not to pass through crossing point A1, based on the object information on the observable objects mapped at step S12 and crossing points A1 to A3 and times To, Ts, and Tt acquired at steps S13 to S16.

At step S17, the vehicle control unit 35 judges whether the oncoming vehicle 15 has slowed down, based on the movement information on the oncoming vehicle 15 mapped at step S12. When judging that the oncoming vehicle 15 has slowed down, the vehicle control unit 35 advances the process to step S18, and when judging that it has not, the vehicle control unit 35 advances the process to step S28.

At step S18, the vehicle control unit 35 judges whether time Tt1 calculated at step S16 is longer than time Ts calculated at step S15. From the result, the vehicle control unit 35 determines whether the vehicle 11 will reach crossing point A1 before the tracked vehicle 12 reaches crossing point A3. When judging that the vehicle 11 will reach crossing point A1 earlier, the vehicle control unit 35 advances the process to step S19, and when judging that it will do later, the vehicle control unit 35 advances the process to step S50.

At step S19, the vehicle control unit 35 controls the steering device 25, the brake device 26, and the like of the vehicle 11 to slows down the vehicle 11, to avoid the vehicle 11 crossing with the tracked vehicle 12.

At step S50, when judging at step S18 that the vehicle 11 will reach crossing point A1 later, the vehicle control unit 35 controls the brake device 26 and the like of the vehicle 11 to make the vehicle 11 go.

At step S20, the vehicle control unit 35 determines whether the vehicle 11 has reached crossing point A0 near the edge of the road 10, based on the movement information on the vehicle 11 mapped at step S12. When judging that the vehicle 11 has reached crossing point A0 near the edge of the road 10, the vehicle control unit 35 advances the process to step S21, and when judging that it has not, the vehicle control unit 35 returns the process to step S10.

At step S21, the vehicle control unit 35 sets time Tt1 calculated at step S16 as stop time for the vehicle 11. It is noted that the stop time can be set rather longer as time Tt1+time Tt2. In this case, if the tracked vehicle 12 is hidden in the hidden area 14, the stop time is calculated based on the speed of the tracked vehicle 12 and the distance between crossing points A2 and A3. If the tracked vehicle 12 is not hidden, the stop time is calculated based on the speed of the oncoming vehicle 15 and the distance between crossing points A2 and A3.

At step S22, the vehicle control unit 35 controls the steering device 25 and the brake device 26 of the vehicle 11 such that the vehicle 11 stops or slows down before the road 10.

At steps S23 to S25, the same processing as in steps S10 to S12 is performed, and the recognition-result storage unit 32 updates the object information on each observable object.

At step S26, the vehicle control unit 35 judges whether the stop time has passed after the processing at step S22 without seeing the tracked vehicle 12 or whether the tracked vehicle 12 has passed through crossing point A2, based on the stop time set at step S21 and the movement information on the tracked vehicle 12. If one of the conditions is satisfied, the vehicle control unit 35 advances the process to step S27, and if none of the conditions is satisfied, the vehicle control unit 35 returns the process to step S23.

At step S27, judging that the possibility of coming into contact with the tracked vehicle 12 is low because the tracked vehicle 12 has stopped or slowed down in the hidden area 14, or the tracked vehicle 12 has already passed through crossing point A2, the vehicle control unit 35 starts the vehicle 11 and makes it enter the road 10. When it is judged that the tracked vehicle 12 has stopped or slowed down in the hidden area 14, the tracked vehicle 12 may come out later. Thus, in this case, the vehicle control unit 35 makes the vehicle 11 go slowly to as it enters the road 10.

At step S28, the vehicle control unit 35 judges whether time Tt (=Tt1+Tt2) calculated at step S16 is long enough compared to time Ts calculated at step S15. The vehicle control unit 35, for example, judges whether time Tt is longer than or equal to a specified threshold determined based on time Ts. If time Tt is longer than or equal to the threshold, the vehicle control unit 35 judges that time Tt is long enough. When judging that time Tt is long enough, the vehicle control unit 35 advances the process to step S29, and when judging that it is not, the vehicle control unit 35 advances the process to step S30.

AT step S29, judging that the vehicle 11 can pass through crossing point A1 safely before the tracked vehicle 12 reaches crossing point A2, the vehicle control unit 35 makes the vehicle 11 go and enter the road 10.

At step S30, the vehicle control unit 35 judges whether the oncoming vehicle 15 has reached a specified distance range from crossing point A3 or the blocking object 13, based on the object information on the oncoming vehicle 15 mapped at step S12. When judging that the oncoming vehicle 15 has reached the specified distance range, the vehicle control unit 35 advances the process to step S31, and when judging that it has not, the vehicle control unit 35 advances the process to step S32.

At step S31, the vehicle control unit 35 judges that the tracked vehicle 12 will not come out of the hidden area 14 by travelling getting into the oncoming lane, and thus the vehicle 11 can pass through crossing point A1 safely, and the vehicle control unit 35 makes the vehicle 11 go and enter the road 10.

At step S32, the vehicle control unit 35 judges whether a following vehicle 19 behind the tracked vehicle 12 has stopped, based on the object information on the observable objects mapped at step S12. When judging that the following vehicle 19 has stopped, the vehicle control unit 35 advances the process to step S33, and when judging that it has not, or there is no following vehicle, the vehicle control unit 35 advances the process to step S34.

At step S33, the vehicle control unit 35 judges that the tracked vehicle 12 will not come out of the hidden area 14 by travelling getting into the oncoming lane, and thus the vehicle 11 can pass through crossing point A1 safely, and the vehicle control unit 35 makes the vehicle 11 go and enter the road 10.

At step S34, the vehicle control unit 35 judges whether time Tt2 calculated at step S16 is longer enough compared to time Ts calculated at step S15. The vehicle control unit 35, for example, judges whether time Tt2 is longer than or equal to a specified threshold determined based on time Ts. If time Tt2 is longer than or equal to the threshold, the vehicle control unit 35 judges that time Tt is long enough. When judging that time Tt2 is long enough, the vehicle control unit 35 advances the process to step S35, when judging that it is not, the vehicle control unit 35 advances the process to step S36.

At step S35, the vehicle control unit 35 judges that the vehicle 11 can pass through crossing point A1 safely even if the tracked vehicle 12 comes out of the hidden area 14 by travelling getting into the oncoming lane, and the vehicle control unit 35 makes the vehicle 11 go and enter the road 10.

At step S36, the vehicle control unit 35 judges that the vehicle 11 may come into contact with the tracked vehicle 12 and controls the steering device 25, the brake device 26, and the like of the vehicle 11 such that the vehicle 11 stops at crossing point A0 near the edge of the road 10.

At steps S37 to S39, the same processing as in steps S10 to S12 is performed, and the recognition-result storage unit 32 updates the object information on the observable objects.

At step S40, the vehicle control unit 35 judges whether the tracked vehicle 12 has passed through crossing point A2, based on the object information on the tracked vehicle 12 mapped at step S39. When judging that the tracked vehicle 12 has passed through crossing point A2, the vehicle control unit 35 advances the process to step S41, and when judging that it has not, the vehicle control unit 35 returns the process to step S37.

At step S41, the vehicle control unit 35 judges that the possibility of coming into contact with the tracked vehicle 12 is low because the tracked vehicle 12 has already passed through crossing point A2, and the vehicle control unit 35 makes the vehicle 11 go and enter the road 10.

Figure 3:
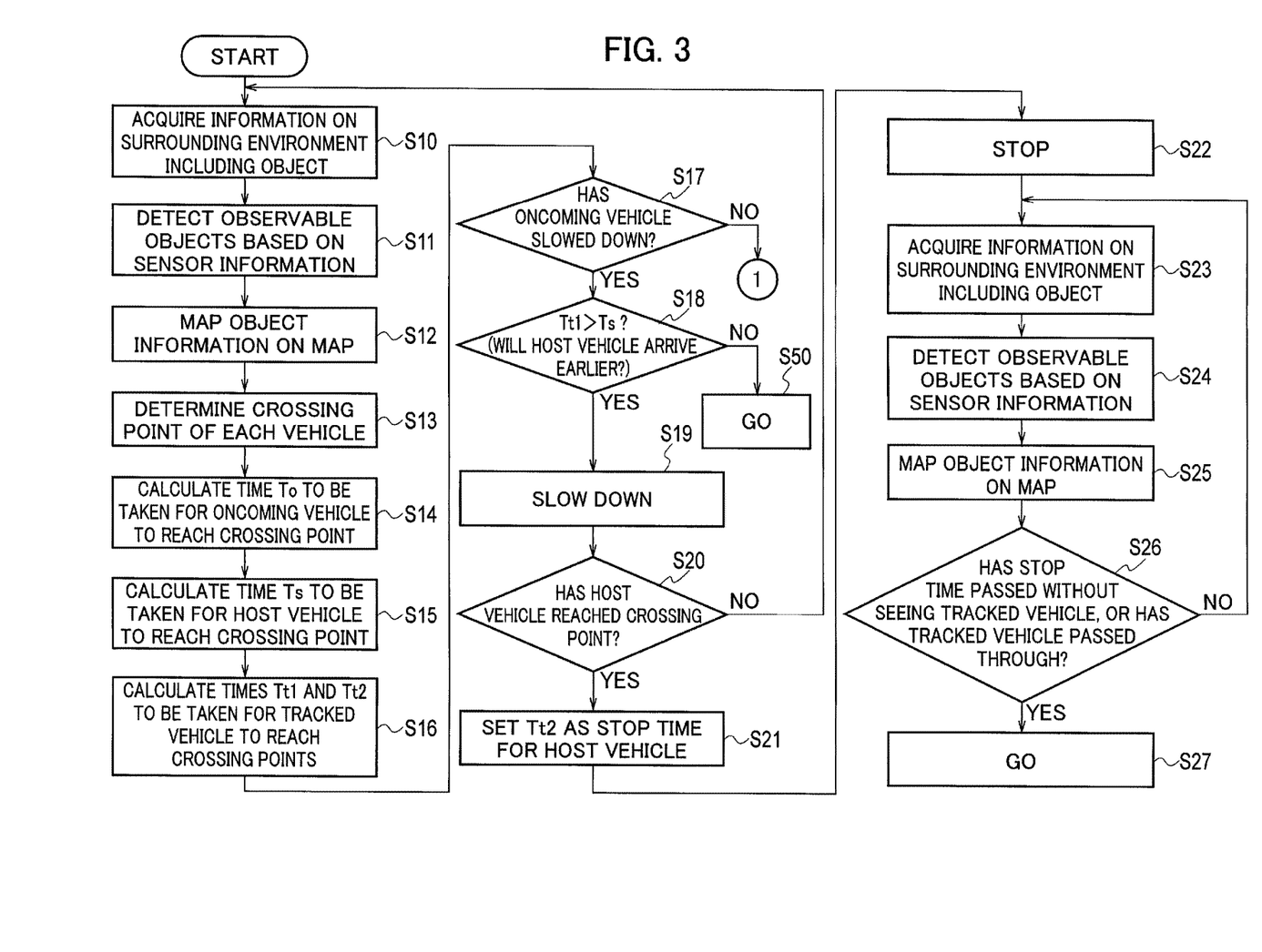
FIG. 3 is a flowchart for explaining an example of a vehicle control method by the vehicle control device according to the embodiment of the present invention.
Figure 4:
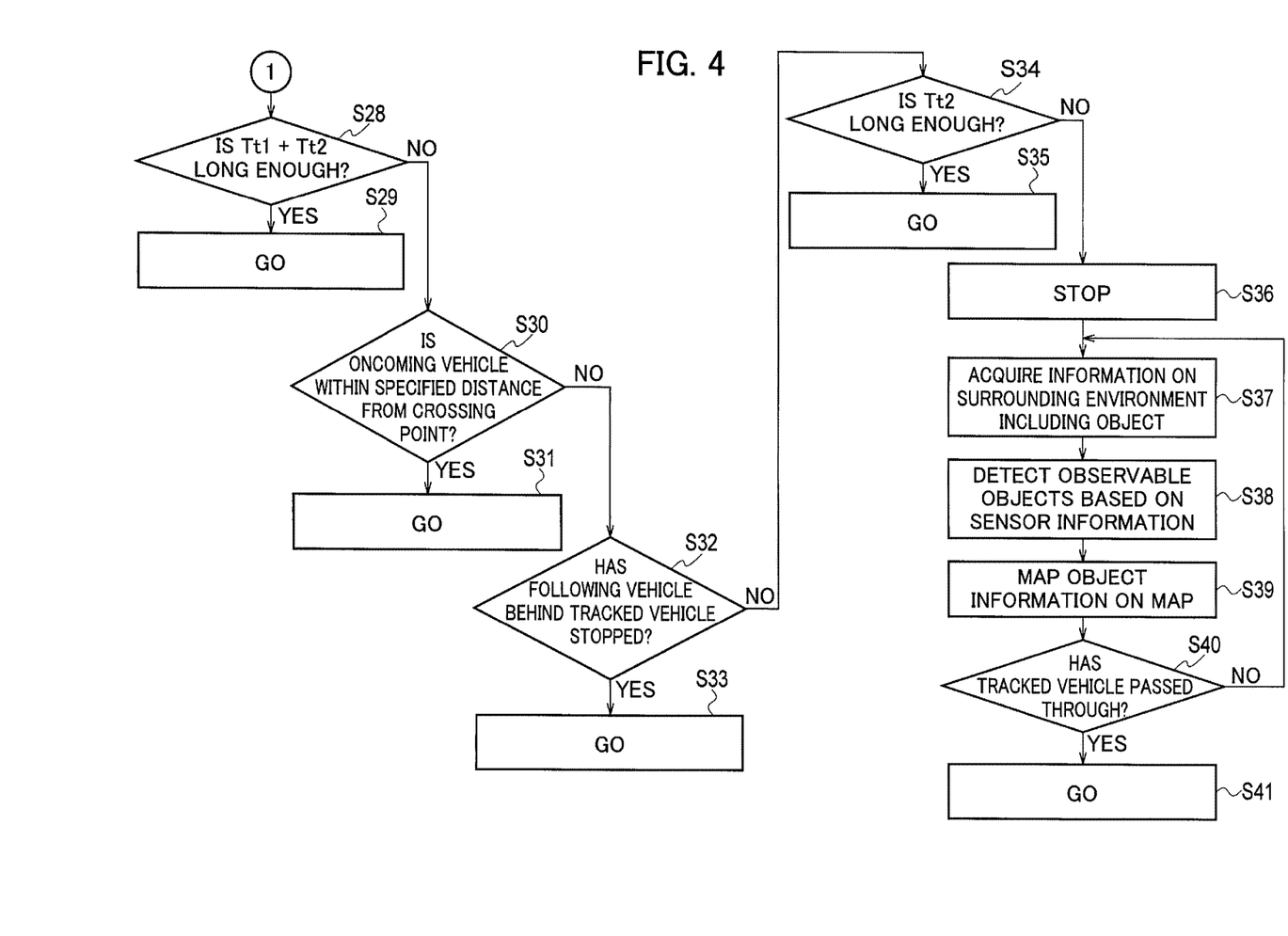
FIG. 4 is a flowchart for explaining the example of the vehicle control method by the vehicle control device according to the embodiment of the present invention.

The series of processes illustrated in FIGS. 3 and 4 is an example, and there can be other various exception handling processes. For example, when an unexpected situation is detected during the above processes, the update processes in steps S10 to S12, steps S23 to S25, or steps S37 to S39 may be performed, and the subsequent processes may be continued.

[Operation Example]

Figure 5:
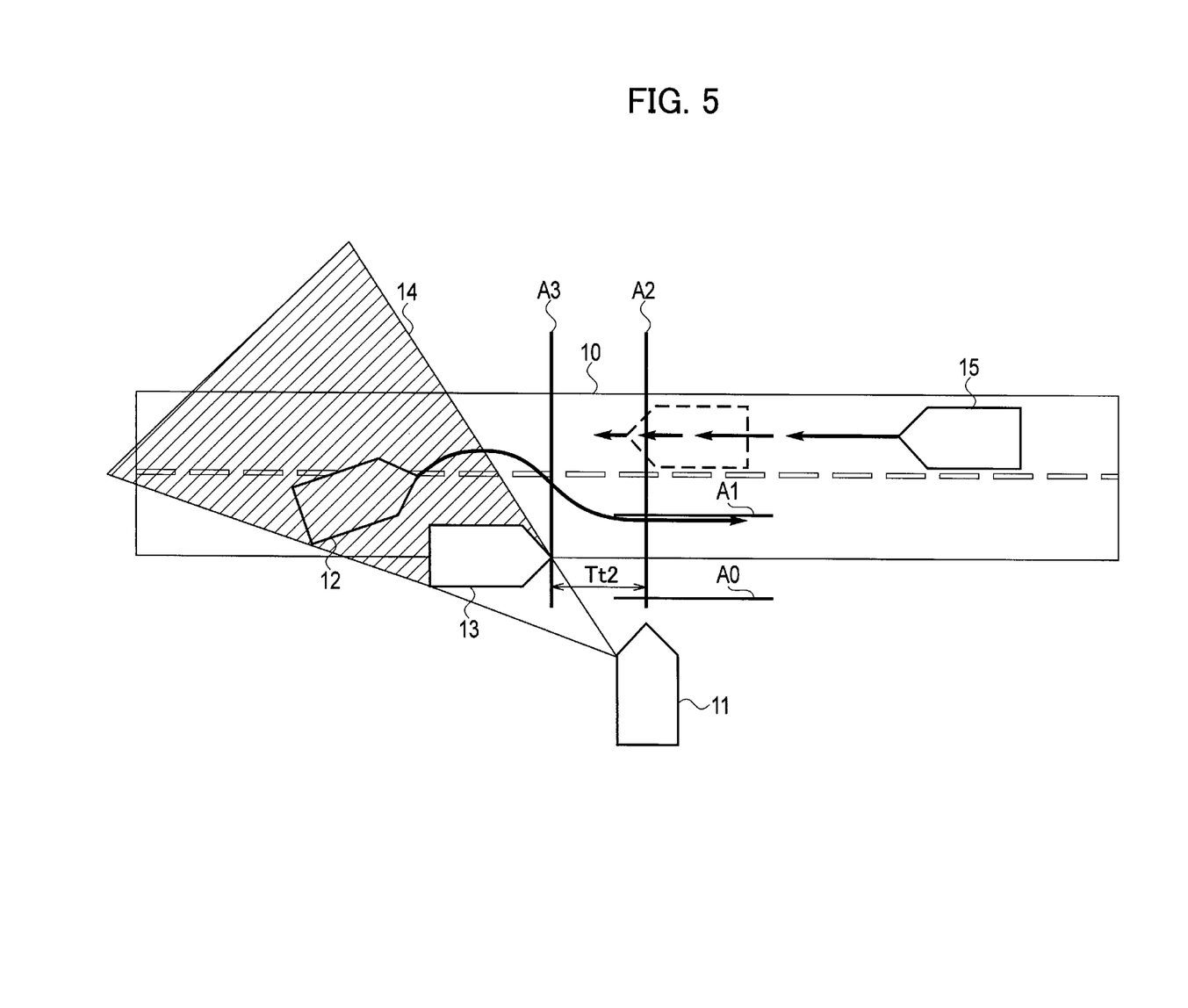
FIG. 5 is a diagram for explaining a scene in which an oncoming vehicle slows down or stops.

FIG. 5 is a diagram for explaining a scene in which the tracked vehicle 12 and the oncoming vehicle 15 encounter each other near crossing point A3, and the oncoming vehicle 15 slows down or stops. In this scene, the tracked vehicle 12, judging that there is an enough distance to the oncoming vehicle 15, gets into the oncoming lane to avoid the blocking object 13. On the other hand, the oncoming vehicle 15, judging that there is a risk of coming into contact with the tracked vehicle 12, slows down or stops before crossing point A3.

In this case, the vehicle control unit 35 judges at step S17 that the oncoming vehicle 15 has slowed down. Since the oncoming vehicle 15 has slowed down, it is predicted that the tracked vehicle 12 will travel getting into the oncoming lane and come out of the hidden area 14. Thus, the vehicle control unit 35 stops or slows down the vehicle 11 before the road 10 (for example, at crossing point A0) at step S22 and wait before entering the road 10, which makes it possible to avoid the vehicle 11 crossing with the tracked vehicle 12.

Alternatively, after judging that the oncoming vehicle 15 has slowed down, if time Tt1 calculated at step S16 is shorter than a specified threshold determine based on time Ts, the vehicle control unit 35 may slow down the vehicle 11 at step S18. This makes it possible for the vehicle 11 to start slowing down before the tracked vehicle 12 comes out of the hidden area 14, and this prevents the situation where the vehicle 11 detects the tracked vehicle 12 suddenly coming out of the hidden area 14 and makes a quick slowdown.

Figure 6:
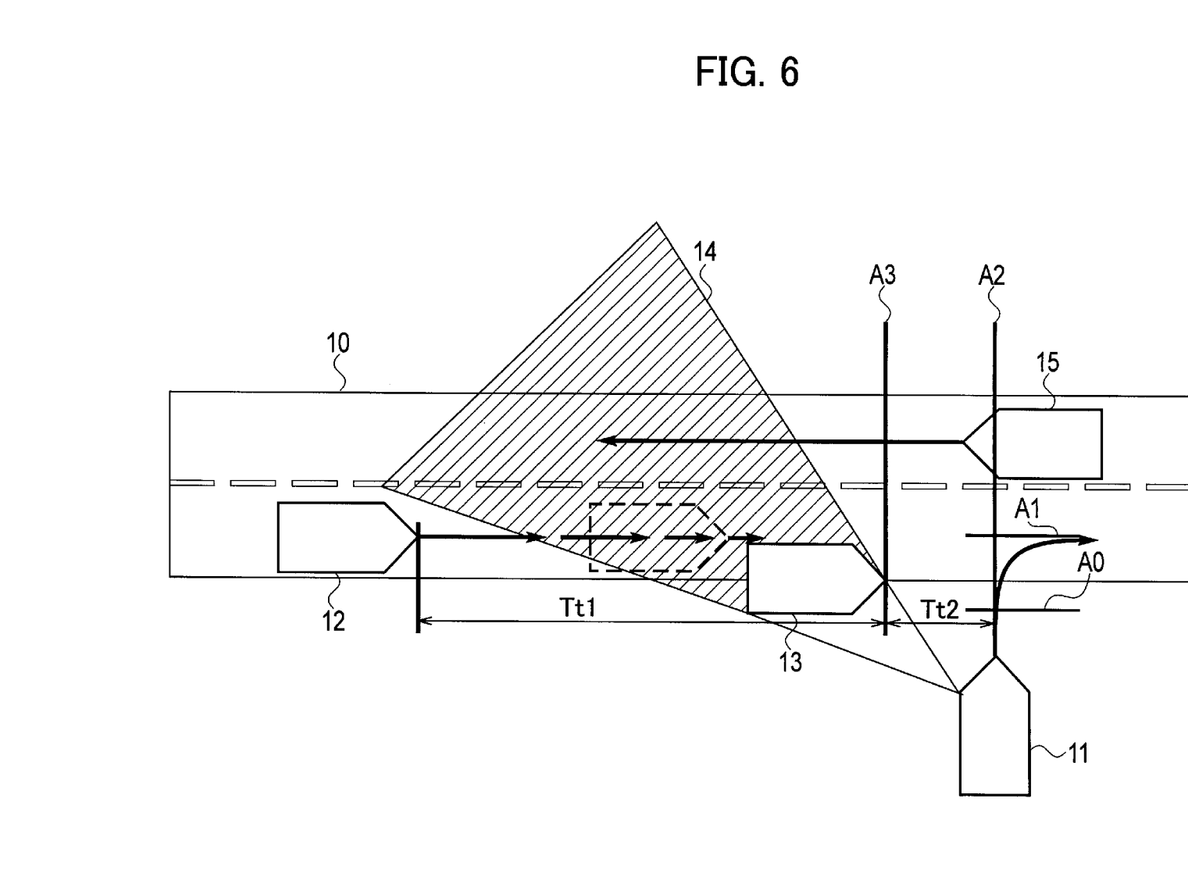
FIG. 6 is a diagram for explaining a scene in which a tracked vehicle slows down or stops.

FIG. 6 is a diagram for explaining a scene in which the tracked vehicle 12 and the oncoming vehicle 15 encounter each other near crossing point A3, and the tracked vehicle 12 slows down or stops. In this scene, the tracked vehicle 12 judges that it is dangerous to get into the oncoming lane to avoid the blocking object 13 because the oncoming vehicle 15 is very close to crossing point A3, and the tracked vehicle 12 slows down or stops within the hidden area 14.

In this case, the vehicle control unit 35 judges at step S17 that the oncoming vehicle 15 will not slow down. Since the oncoming vehicle 15 travels without slowing down, it is predicted that the tracked vehicle 12 will not come out of the hidden area 14, avoiding the blocking object 13 and the oncoming vehicle 15. Thus, the vehicle control unit 35 can make the vehicle 11 enter the road 10 smoothly at step S31.

Figure 7:
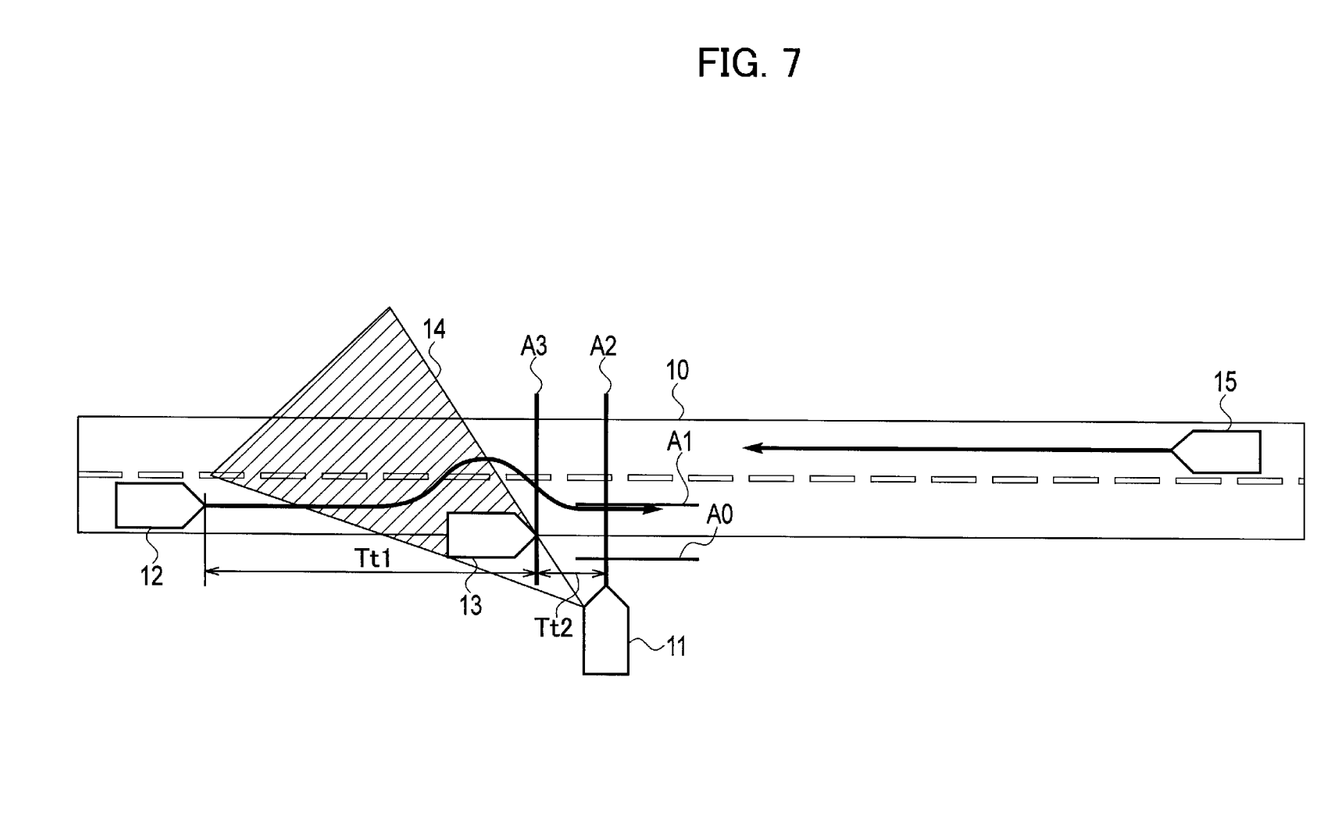
FIG. 7 is a diagram for explaining a scene in which both the tracked vehicle and the oncoming vehicle travel without slowing down.

FIG. 7 is a diagram explaining a scene in which both the tracked vehicle 12 and the oncoming vehicle 15 travel without slowing down. In this scene, because the oncoming vehicle 15 is far enough from crossing point A3, and the tracked vehicle 12 can pass through crossing point A3 earlier than the oncoming vehicle 15 will pass, both the tracked vehicle 12 and the oncoming vehicle 15 travels without slowing down.

In this case, it is predicted that the tracked vehicle 12 suddenly comes out of the hidden area 14. Thus, the arrival-time estimation unit 34 calculates time Tt to be taken for the tracked vehicle 12 to reach crossing point A2, and the vehicle control unit 35 judges whether or not to go depending on time Tt. For example, if it is judged at step S28 that time Tt is long enough because the tracked vehicle 12 has not enter the hidden area 14 yet, the possibility of the vehicle 11 coming into contact with the tracked vehicle 12 is low, and thus the vehicle 11 can enter the road 10 at step S29. In addition, also in the case where it is judged at step S34 that time Tt2 is long enough because, even though the tracked vehicle 12 is in the hidden area 14, the distance from the hidden area 14 to crossing point A2 is large enough; the possibility of the vehicle 11 coming into contact with the tracked vehicle 12 is low, and thus the vehicle 11 can enter the road 10 at step S35.

Figure 8:
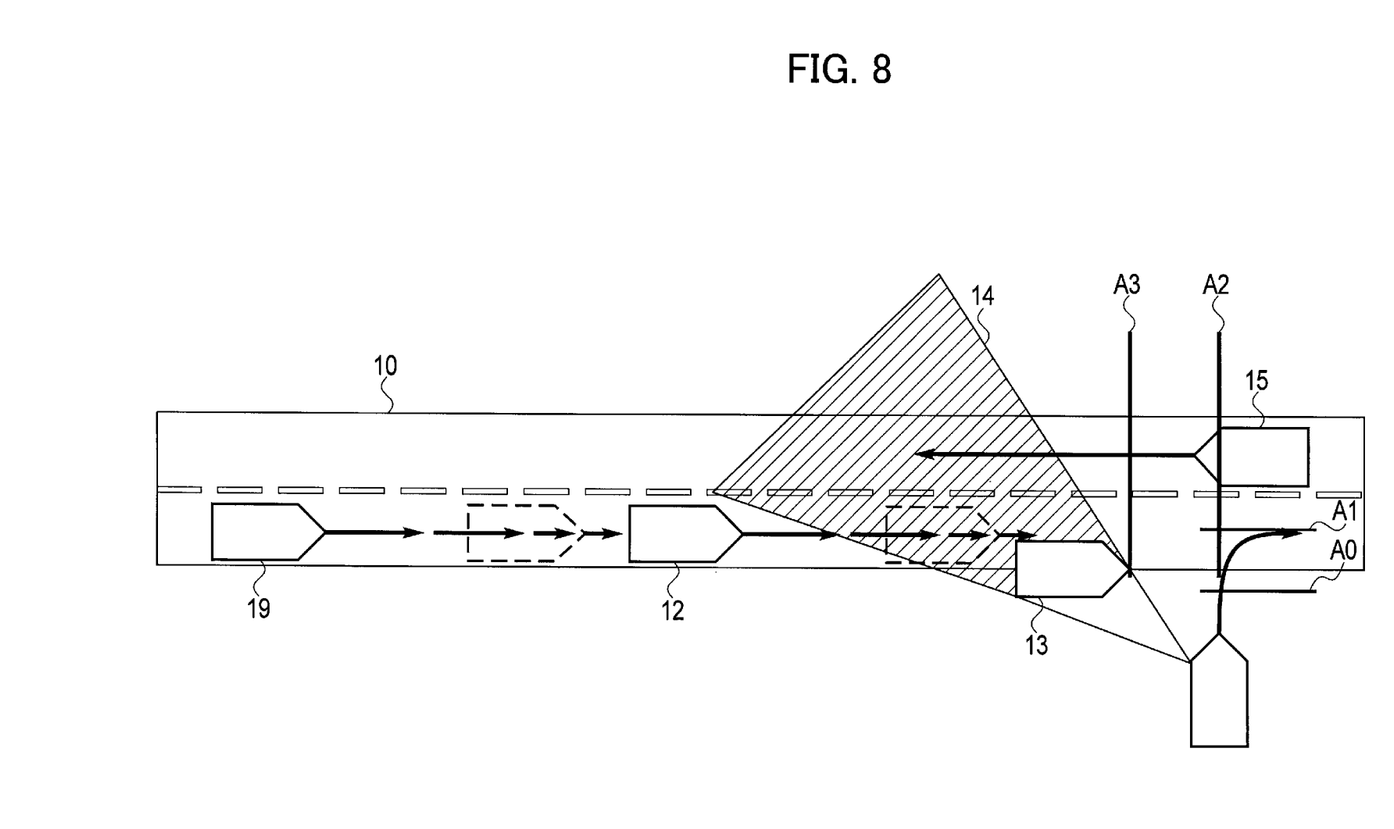
FIG. 8 is a diagram for explaining a scene in which a following vehicle behind the tracked vehicle slows down or stops.

FIG. 8 is a diagram for explaining a scene in which the tracked vehicle 12 slows down or stops in the hidden area 14, and thus the following vehicle 19 behind the tracked vehicle 12 slows down or stops. In this scene, since it is detected that the following vehicle 19 has slowed down, it is presumed that the tracked vehicle 12 in the hidden area 14 has slowed down or stopped. Thus, the vehicle control unit 35 can make the vehicle 11 enter the road 10 smoothly at step S33. It is noted that in the cases other than the above, the vehicle control unit 35 judges whether or not to go according to the procedure from step S28 to S41 in FIG. 4.

The vehicle control device 20 according to this embodiment estimates the behavior of the tracked vehicle 12 from the behavior of the oncoming vehicle 15 in the case where the behavior of the tracked vehicle 12 cannot be detected due to the presence of the tracked vehicle 12 in the hidden area 14. This makes it possible for the vehicle control device 20 to control the vehicle according to the behavior of the tracked vehicle 12 and to avoid the vehicle 11 coming into contact with the tracked vehicle 12, and thus this improves the safety.

In addition, in the case where the oncoming vehicle 15 slows down and time Tt1 until the tracked vehicle 12 passes by the blocking object 13 is shorter than a specified threshold, the vehicle control device 20 slows down the vehicle 11. This makes it possible for the vehicle 11 start slowing down before the tracked vehicle 12 comes out of the hidden area 14 in the case where the tracked vehicle 12 is in the hidden area 14, reducing the number of chances in which the vehicle 11 detects the tracked vehicle 12 suddenly coming out of the hidden area 14 and makes a quick slowdown. Thus, this improves comfort in driving.

In addition, the vehicle control device 20 sets the stop time for which the vehicle 11 stops at crossing point A0 near the edge of the road 10, based on time Tt2 to be taken for the tracked vehicle 12 to reach the front of the vehicle 11 after passing by the blocking object 13. This prevents the waiting time from increasing more than necessary even in the case, for example, where the tracked vehicle 12 stops in the hidden area 14, and makes it possible to start the vehicle after a minimum waiting time.

In addition, in the case where the oncoming vehicle 15 does not slow down, and where time Tt1 or time Tt until the tracked vehicle 12 passes by the blocking object 13 is longer than a specified threshold, the vehicle control device 20 makes the vehicle 11 go. This prevents the vehicle 11 from slowing down unnecessarily when the tracked vehicle 12 is traveling at a position far enough, making it possible for the vehicle 11 to enter the road 10 smoothly.

In addition, when the oncoming vehicle 15 is within a specified distance range from the blocking object 13, the vehicle control device 20 makes the vehicle 11 go. In this case, it is presumed that the tracked vehicle 12 has stopped or slowed down in the hidden area 14 to give way to the oncoming vehicle 15. This prevents the vehicle 11 from slowing down unnecessarily when the tracked vehicle 12 is hidden from the sensor 21, making it possible for the vehicle 11 to enter the road 10 smoothly.

In addition, the vehicle control device 20 makes the vehicle 11 go when the following vehicle 19 behind the tracked vehicle 12 has slowed down or stopped. In this case, it is presumed that the tracked vehicle 12 has stopped or slowed down in the hidden area 14 to give way to the oncoming vehicle 15. This prevents the vehicle 11 from slowing down unnecessarily when the tracked vehicle 12 is hidden from the sensor 21, making it possible for the vehicle 11 to enter the road 10 smoothly.

[Other Embodiments]

As described above, the present invention has been described using the above embodiment. However, it should not be understood that the description and the drawings constituting part of this disclosure limit the present invention. From this disclosure, various alternative embodiments, examples, and operational techniques will be apparent to those skilled in the art.

For example, in the embodiment already described, the blocking object 13 is not limited to a parked vehicle but may be a planimetric feature around the road 10. In addition, the road 10 may be a road intersecting the road on which the vehicle 11 is travelling.

As a matter of course, besides the above, the present invention includes various embodiments and the like not described herein, such as configurations to which the above configurations are mutually applied. Thus, the technical scope of the present invention is determined only by the matters specifying the invention according to the claims, relevant to the above description.

REFERENCE SIGNS LIST 11 vehicle
12 tracked vehicle
13 blocking object
15 oncoming vehicle
19 following vehicle
20 vehicle control device
21 sensor
30 control circuit

The invention claimed is:

1. A vehicle control method using a sensor detecting position information on an object around a vehicle and a control circuit controlling the vehicle according to a tracked vehicle detected based on the position information, the method comprising:
   detecting, by the control circuit, a blocking object that is at a position at which the blocking object obstructs travel of the tracked vehicle in a traffic lane in which the tracked vehicle is traveling and that hides at least part of the traffic lane from the sensor, and an oncoming vehicle traveling in a direction toward the tracked vehicle in an oncoming lane opposite from the traffic lane; and
   slowing down the vehicle by the control circuit when the oncoming vehicle slows down.

2. The vehicle control method according to claim 1, wherein
   the control circuit estimates passing time until the tracked vehicle passes through an area hidden by the blocking object, based on speed of the oncoming vehicle and distance from the oncoming vehicle to the blocking object, and
   the control circuit slows down the vehicle when the oncoming vehicle slows down and the passing time is shorter a specified threshold.

3. The vehicle control method according to claim 1, wherein
   the control circuit estimates arrival time after the tracked vehicle passes by the blocking object until the tracked vehicle reaches a front of the vehicle, based on speed of the oncoming vehicle and distance from the front of the vehicle to the blocking object, and
   the control circuit sets stop time for the vehicle based on the arrival time.

4. The vehicle control method according to claim 1, wherein
   the control circuit estimates passing time until the tracked vehicle passes through a hidden area caused by the blocking object, based on speed of the oncoming vehicle and distance from the oncoming vehicle to the blocking object, and
   the control circuit does not slow down the vehicle when the oncoming vehicle does not slow down and the passing time is longer than or equal to a specified threshold.

5. The vehicle control method according to claim 1, wherein
   the control circuit does not slow down the vehicle when the oncoming vehicle is within a specified distance range from the blocking object.

6. The vehicle control method according to claim 1, wherein
   the control circuit does not slow down the vehicle when a following vehicle behind the tracked vehicle has stopped.

7. A vehicle controller comprising:
   a sensor detecting position information on an object around a vehicle; and
   a control circuit controlling the vehicle according to a tracked vehicle detected based on the position information, wherein
   the control circuit detects a blocking object that is at a position at which the blocking object obstructs travel of the tracked vehicle in a traffic lane in which the tracked vehicle is traveling and that hides at least part of the traffic lane from the sensor, and an oncoming vehicle traveling in a direction toward the tracked vehicle in an oncoming lane opposite from the traffic lane, and
   the control circuit slows down the vehicle when the oncoming vehicle slows down.

* * * * *